United States Patent [19]
Vaezi

[11] Patent Number: 5,351,314
[45] Date of Patent: Sep. 27, 1994

[54] METHOD AND APPARATUS FOR IMAGE ENHANCEMENT USING INTENSITY DEPENDENT SPREAD FILTERING

[75] Inventor: Mehrzad R. Vaezi, Irvine, Calif.

[73] Assignee: Canon Information Systems, Inc., Costa Mesa, Calif.

[21] Appl. No.: 771,220

[22] Filed: Oct. 4, 1991

[51] Int. Cl.$^5$ .......................... G06K 9/36; G06K 9/44
[52] U.S. Cl. ...................................... 382/54; 382/55; 382/42
[58] Field of Search ....................... 382/54, 55, 42, 25, 382/45; 358/447, 463

[56] References Cited

U.S. PATENT DOCUMENTS

| | | | |
|---|---|---|---|
| 4,197,583 | 4/1980 | Westell et al. | 382/6 |
| 4,692,943 | 9/1987 | Pietzsch et al. | 382/55 |
| 4,855,933 | 8/1989 | Kondo | 364/518 |
| 4,884,225 | 11/1989 | Fogarty et al. | 382/42 |
| 4,891,750 | 1/1990 | Pastor et al. | 382/25 |
| 5,119,444 | 6/1992 | Nishihara | 382/45 |

FOREIGN PATENT DOCUMENTS

| | | |
|---|---|---|
| 60-178588 | 9/1985 | Japan. |
| 63-269267 | 11/1988 | Japan. |

OTHER PUBLICATIONS

J. M. Coggins, et al., "Printed Character Recognition Using An Artificial Visual System", Proceedings of the 1986 IEEE International Conference on Systems, Man & Cybernetics, vol. 2, No. 14, Oct. 1968, pp. 1612–1616.

T. Poggio, et al., "Ill-Posed Problems And Regularization Analysis In Early Vision", MIT AI Lab Memo No. 773, Apr., 1984.

J. F. Canny, "Finding Edges And Lines In Images", MIT AI Lab, Tech. Rep. No. 720, Jun., 1983.

T. Poggio, et al., "A Regularized Solution To Edge Detection", MIT AI Memo 833, May, 1983.

T. Poggio, "Vision By Man And Machine: How The Brain Processes Visual Information May Be Suggested By Studies In Computer Vision (and vice versa)", MIT AI Memo 776, Mar., 1984.

A. P. Witkin, "Scale-space Filtering", Proc. Int. Joint Conf. Artif. Intell., West Germany, Aug., 1983.

T. N. Cornsweet, et al., "Intensity-Dependent Spread Summation", JOSA, vol. 2, No. 10, Oct., 1985.

D. Marr, et al., "Theory Of Edge Detection", Proc. R. Soc. London, pp. 187–217, 1980.

H. B. Barlow, "Increment Thresholds At Low Intensities Considered as Signal/Noise Discriminations", J. Physiol. (London), col. 136, pp. 469–488, 1957.

V. D. Glezer, "The Receptive Fields Of The Retina", Vision Res., vol. 5, 1965, pp. 497–525.

M. R. Vaezi, *A Model for the Spatial Characteristics of the Human Retina: Optimum Intensity Dependent Spread Filters*, Dissertation submitted in partial satisfaction of the requirements for the degree of Doctor of Philosophy in Engineering. Dec. 1990.

M. Vaezi, et al., "Optimum Intensity-Dependent Spread Filters In Image Processing", Proc. SPIE/SPSE Symposium on Electronic Imaging Conf., Feb., 1991.

Cornsweet, T. "Intensity-dependent spread-A Theory of human vision and a machine vision filter with Interesting Properties" Sixth Multidimensional Signal Processing Workshop Cat. No. 89TH0290-7 Sep. 6–8 1989.

*Primary Examiner*—Leo H. Boudreau
*Assistant Examiner*—Larry J. Prikockis
*Attorney, Agent, or Firm*—Fitzpatrick, Cella, Harper & Scinto

[57] ABSTRACT

Method and apparatus for image enhancement involving smoothing and thinning input image data, segmenting adjacent characters in the smoothed and thinned data, and identifying a segmented character based on a comparison of the segmented character to a dictionary of characters. Smoothing and thinning may be provided by applying to each pixel of input image data a filter whose spread depends on variations in image intensity of surrounding pixels to obtain filtered image data, deriving inverted image data from first difference data of the filtered image data and multiplying the inverted image data and the filtered image data to obtain smoothed and thinned image data. The filters may be Gaussians whose spreads are inversely proportionate to variations in input image intensity plus a constant and the filters may be applied to the image data using a variably filled mask of filter values.

30 Claims, 6 Drawing Sheets

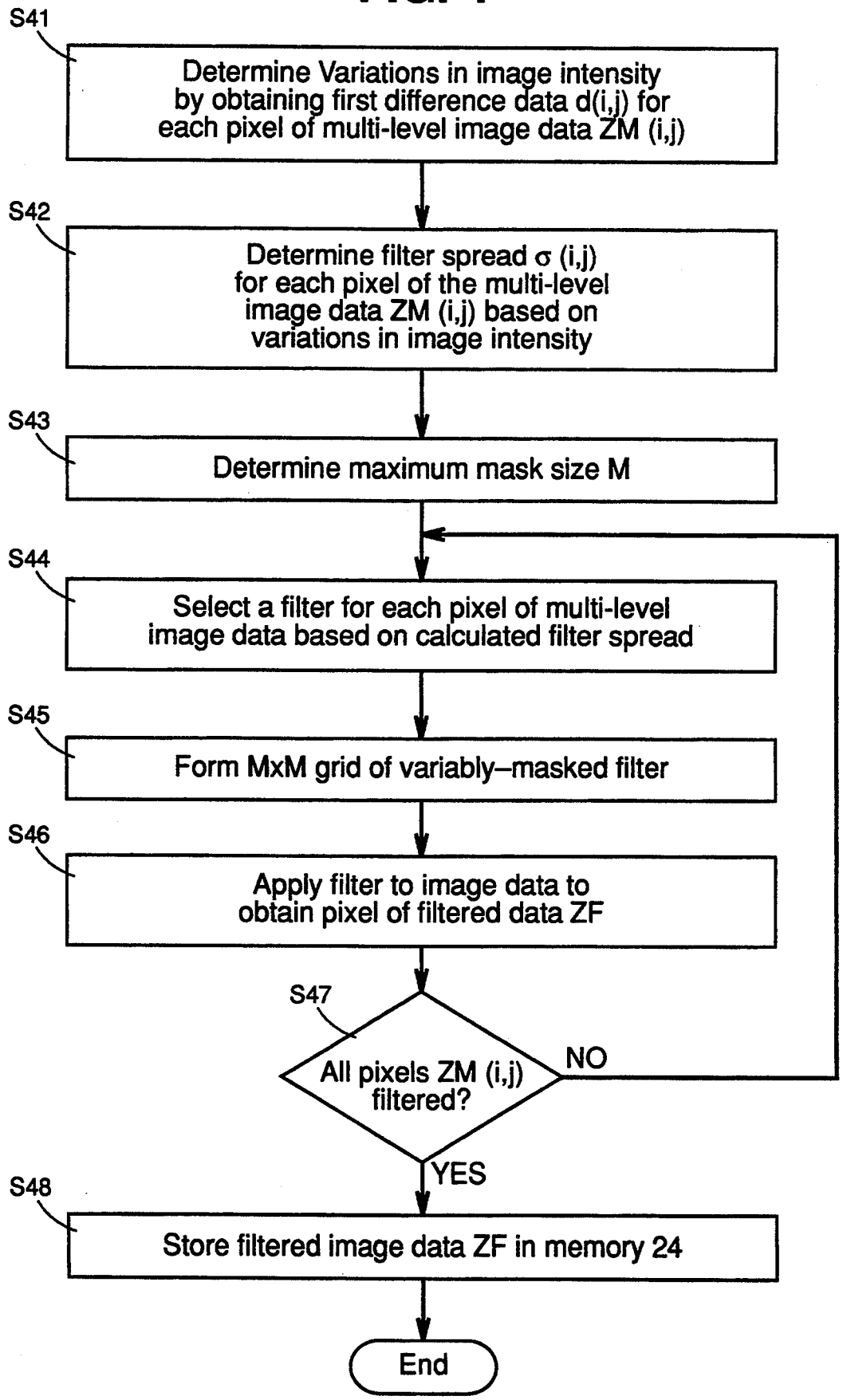

METHOD AND APPARATUS FOR IMAGE ENHANCEMENT USING INTENSITY DEPENDENT SPREAD FILTERING

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention pertains to a method and apparatus for image enhancement, including smoothing and thinning degraded images such as camera images, scanned images, facsimile-transmitted images and images containing letters, numbers, symbols, characters and the like. More particularly, the invention is concerned with a method for processing image data so as to enhance the quality of the image.

Text or pictorial images today are often replicated or transmitted by a variety of techniques, such as photocopying, facsimile transmission, and scanning images into a memory device. Due to a variety of factors, the process of replication or transmission often tends to degrade the resulting image. Degraded images are characterized by noise spots, indistinct or shifted edges, blended or otherwise connected characters and distorted shapes. A reproduced or transmitted image that is degraded in quality may be unusable in certain applications. For example, if the reproduced or transmitted image is to be used in conjunction with character recognition apparatus, the noise spots, indistinct edges, connected characters, etc. may preclude accurate or successful recognition of characters in the image. Also, if the degraded image is printed or otherwise rendered visible, the image may be more difficult to read and in general, less visually distinct.

FIG. 6 is an example of a degraded image of the word "This." As seen in FIG. 6, a noise spot 1 clutters the image making analysis difficult. Additionally, the letters "T" and "h" are connected at 2, while the letter "h" is distorted at 3 by a break in the letter.

To improve image quality, in the case of pixel image data stored in a computer memory, it has been proposed to improve the stored image data by applying a low pass filter to it. Typically, a Gaussian filter is applied to smooth the data. Such filters purport to remove noise spots, but do so only at the expense of further blurring and/or connecting of the image and further degradation in edge sharpness.

SUMMARY OF THE INVENTION

The present invention addresses these problems through the provision of a method, and an apparatus employing the method, that will both smooth and thin the image data prior to, for example, its reproduction or its further processing for pattern or character recognition processing. Smoothing removes noise spots, whereas thinning narrows line width and therefore corrects the blurring referred to above. As a result, image data is reduced to its essentials and images reproduced from such data are clearer. In particular, as applied to character images, since the filter removes noise spots and narrows line width, partial segmentation of connected characters results, which makes the image more distinct and facilitates further segmentation and accurate and successful character recognition. In addition, since the filter reduces image data to its essentials, similar character image patterns are produced for many different input character fonts. If the characters are underlined or enclosed in boxes (for example in a table of numbers), the invention makes it possible to remove such extraneous features. Thus, in the case where the subject invention is used in a character recognition apparatus or applied prior to a character recognition operation, it is possible to reduce the size of the character dictionary.

In one aspect, the invention is an image processing method comprising the steps of deriving for each pixel of image data an associated filter whose spread is based on variations in intensity of surrounding pixels, and applying each filter to its associated pixel to obtain processed image data. Each filter may be a Gaussian filter whose spread is inversely proportionate to variations in image intensity of surrounding pixels plus a constant, each filter may be applied to the image data using a mask of predetermined dimensions, and the mask may be zero-filled based on the filter's spread.

In another aspect, the invention is a method of smoothing and thinning image data comprising the steps of applying a filter that depends on variations in intensity of the image data to each pixel of image data to obtain filtered image data, deriving inverted data from first difference data of the filtered image data, and multiplying the inverted data and the filtered image data to obtain smoothed and thinned image data. Each filter may be a Gaussian filter whose spread is inversely proportionate to variations in image intensity of surrounding pixels plus a constant, each filter may be applied using a mask of predetermined dimensions, and the mask may be zero-filled based on the calculated spread.

In yet another aspect, the invention is a character recognition method comprising the steps of smoothing and thinning input image data, segmenting adjacent characters in the smoothed and thinned data, and determining the identity of a segmented character based on a comparison of the segmented character to a dictionary of characters.

BRIEF DESCRIPTION OF THE DRAWINGS

FIG. 4 is a detailed flow chart showing a variable mask filter used in the practice of the invention;

FIG. 5, comprising

DETAILED DESCRIPTION OF THE PREFERRED EMBODIMENT

The present invention can be implemented in a variety of devices where image enhancement is desirable, such as apparatus dedicated to image processing or image reproduction, including photocopiers, facsimile machines, video or still-video cameras, laser beam printers and the like. It can also be implemented in general purpose computers and office equipment, such as personal computers and integrated office automation tools combining a number of business equipment capabilities.

Figure 1:
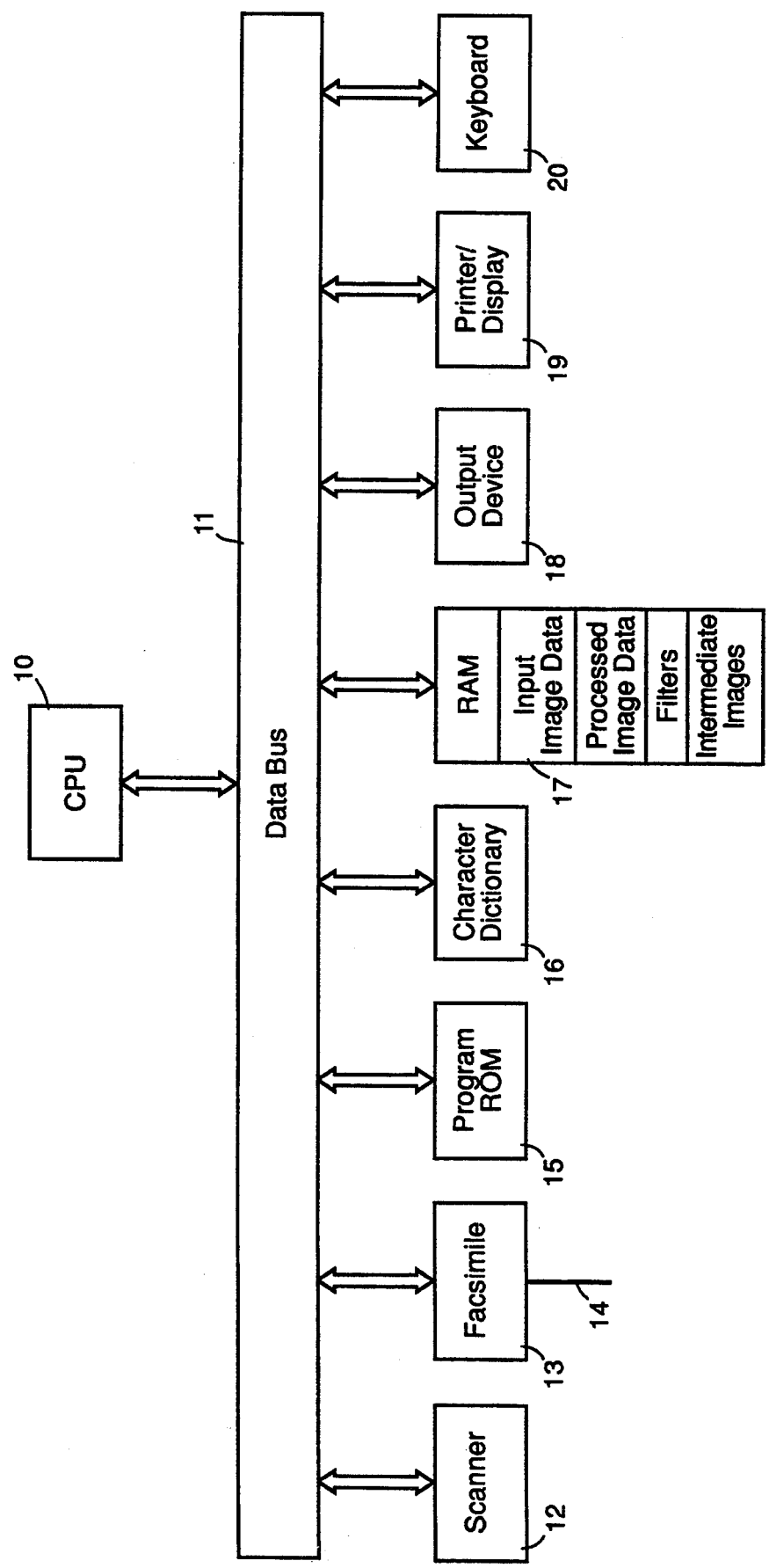
FIG. 1 is a block diagram of an apparatus of the present invention.

FIG. 1 is a block diagram of a typical embodiment utilizing the present invention in connection with an integrated office automation tool having scanning, facsimile and information processing capabilities, the latter optionally including data processing and word processing capabilities. The apparatus in FIG. 1 utilizes the present invention to process degraded image data, prior to the data being subjected to a character recognition operation.

In the apparatus shown in FIG. 1, degraded images may be received, for example, by facsimile transmission to the apparatus. With the invention, it is possible to recognize the characters in the degraded image to create a computer text file of the recognized characters, and to employ the word processing, spreadsheet processing or other information processing capabilities of the apparatus to modify the text file for subsequent re-transmission or other output.

In FIG. 1, a central processing unit ("CPU") 10, such as a programmable microprocessor, is connected to a data bus 11. A number of other devices are also connected to data bus 11. In particular, a scanner 12 for scanning an image pixel-by-pixel into image memory (RAM 17, described below) is connected to bus 11, as are a facsimile device 13 (optionally including a telephone, not shown) for transmitting and receiving image data on a telephone line 14 and a read only memory ("ROM") 15 for storing one or more computer programs for execution by CPU 10. Further connected to data bus 11 are a memory 16 for storing a dictionary of characters against which input characters are compared, a random access memory ("RAM") 17 for storing intermediate data, such as input image data, intermediate products, processed image data, derived image filters and the like, an output device 18 (such as disk memory, a modem, etc.) for outputting the identity of characters recognized in the input image data, a printer/display 19 for displaying images processed by the apparatus, and a keyboard 20 for allowing operator control of the apparatus.

Although the devices connected to data bus 11 are incorporated into an integrated office automation tool, it is understood that some or all of these devices can alternatively be provided on a stand-alone basis.

Scanner 12 and facsimile 13 constitute alternative forms of input means for inputting image data into the apparatus. In the case of scanner 12, originals are scanned line-by-line and pixel-by-pixel, and under the control of CPU 10, the pixels of image data are stored in bit map format in image memory in RAM 17, as described more fully below. In the case of facsimile 13, image data is received in compressed form over telephone line 14. The compressed image data is uncompressed into a pixel image by means conventional in the art, and CPU 10 stores the pixels of image data in bit map format in image memory in RAM 17. Other input means are, of course, possible, and the image data may simply be retrieved from a mass storage medium such as a disk memory or derived from a video camera.

Facsimile 13 and printer/display 19 constitute alternative forms of output means for outputting processed image data pixel-by-pixel for viewing at the apparatus (in the case of printer/display 19), or at a remote location (in the case of facsimile 13). Under the control of CPU 10, processed image data is retrieved from processed image data memory in RAM 17 and routed to the appropriate unit.

Output device 18 is means for outputting the identity of characters recognized in the image data, for example, in ASCII code. The characters' identities may be output at the apparatus (such as a disk memory), or may be output for transmission to a remote location (such as a modem). Output device 18 may also include means for reformatting the characters' identities such as conversion from ASCII to facsimile-compatible format so as to allow transmission to a remote facsimile machine.

Figure 2:
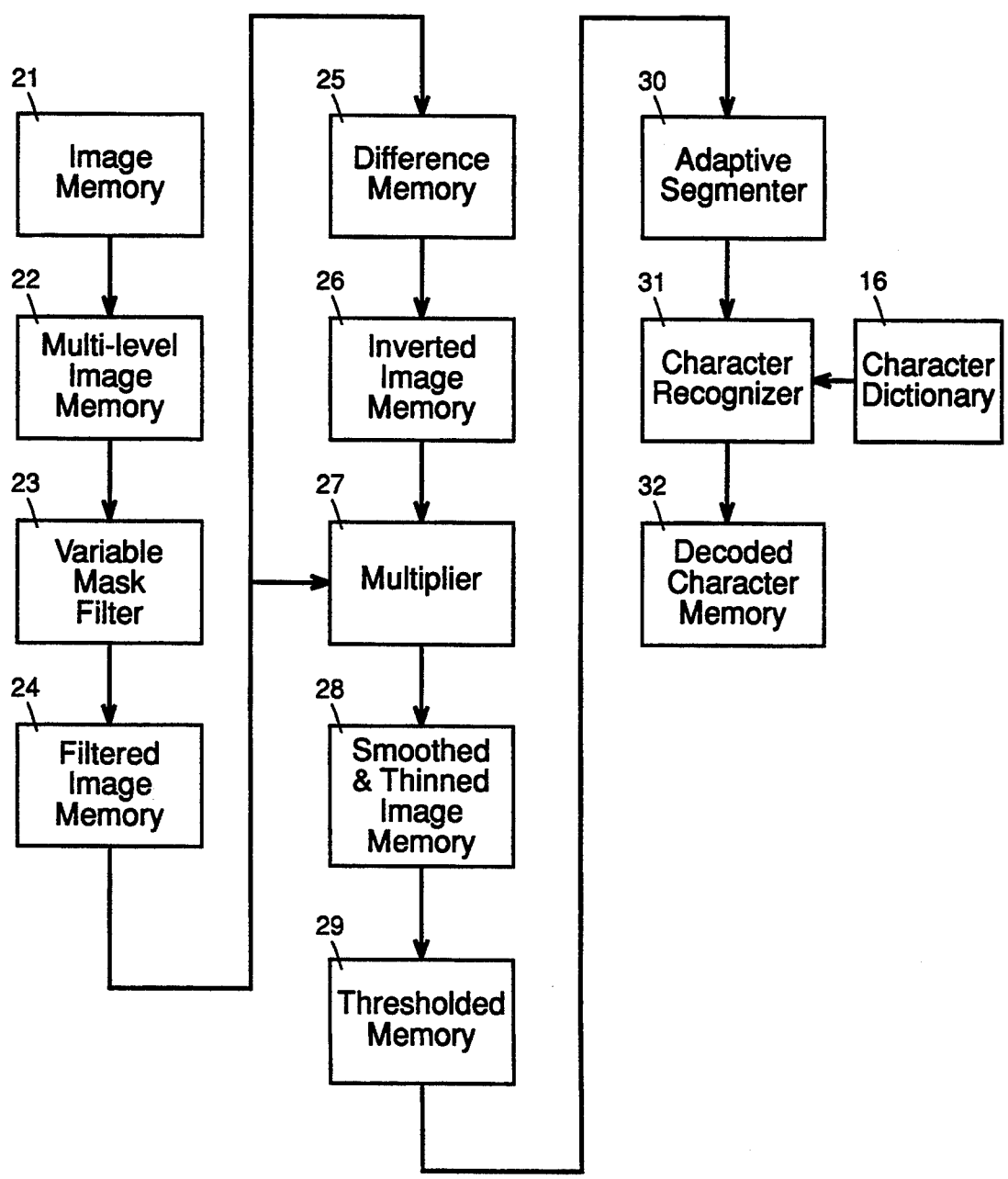
FIG. 2 is a functional block diagram showing an image processing method of the present invention as carried out by the apparatus of FIG. 1.

FIG. 2 is a functional block diagram for explaining the operation of the FIG. 1 apparatus. The processes depicted in FIG. 2 are executed by CPU 10 in accordance with a computer program stored in program ROM 15.

As shown at 21, image data is obtained by CPU 10 from scanner 12 or facsimile 13 and stored in image memory in RAM 17.

Figure 3:
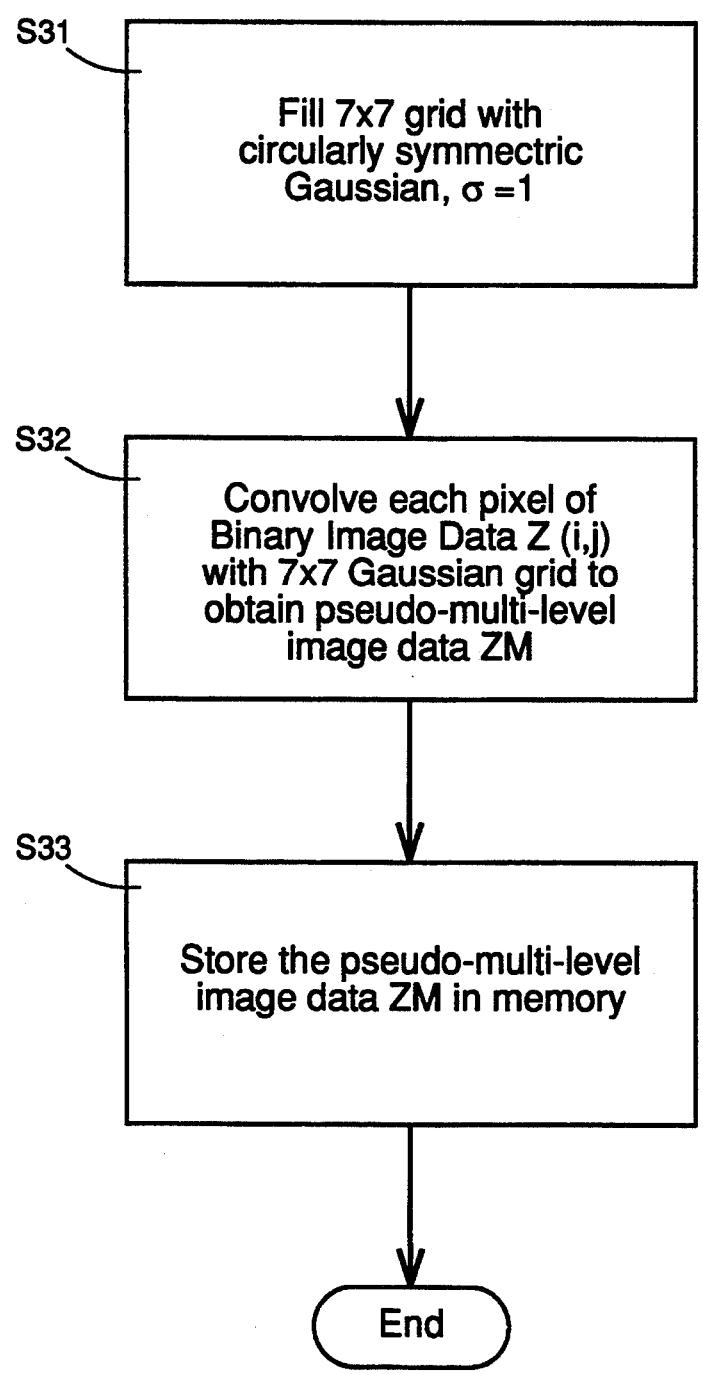
FIG. 3 is a detailed flow chart showing a method for producing multi-level image data from binary image data.

Preferably, the image data is multi-level image data, such as gray-scale and/or color image data, and not binary image data. If the image data is binary data, it may be converted by CPU 10 into pseudo-multi-level image data by the process shown in FIG. 3. By the procedure depicted in that figure, binary image data is converted to pseudo-multi-level image data by applying a filter to the binary data. Preferably, a circularly symmetric Gaussian is applied to the binary image data, but filters with other shapes, such as triangular, rectangular, exponential or parabolic, may also be used. More particularly, it has been experimentally determined that a Gaussian whose spread is constant at $\sigma=1$ provides suitable results; other spreads are possible and different spreads may be readily determined if necessary to suit the particular image data under consideration. Mathematically, it is known that a Gaussian includes 99.7% of all its volume (or area for a one-dimensional filter) within a region extending $\pm 3\sigma$ from its mean, i.e., a range of $6\sigma$. Since $\sigma=1$ for the Gaussian used here, 99.7% of all volume will be included in a 6×6 pixel grid. The next largest odd number is chosen so that there will be a uniquely identifiable center pixel. Thus, in step S31, a 7×7 grid is filled with a Gaussian as follows:

$$G[m, n; \sigma = 1] = \frac{1}{\sqrt{2\pi}} \exp\left[-\frac{1}{2}(m^2 + n^2)\right] \quad (1)$$

where both m and n vary around the center pixel (0,0) between −3 and +3, inclusive.

In step S32, the input binary image data Z is convolved with the Gaussian derived in step S31 to obtain pseudo-multi-level data ZM. Thus, each pixel ZM (k,l) is derived as follows:

$$ZM(k,l) = \Sigma\Sigma G[i-k, j-l; \sigma=1]Z(i,j) \quad (2)$$

where the left summation is taken from $i=k-3$ to $k+3$ and the right summation is taken from $j=l-3$ to $j=l+3$. Beyond the edges of the input image data, $Z(i,j)$ is set to zero. Alternatively, $Z(i,j)$ may be edge-extended, that is, the values of $Z(i,j)$ at the edges may be used beyond the edges.

Referring again to FIG. 2, CPU 10 stores the resulting pseudo-multi-level image data ZM in multi-level image memory 22 within RAM 17 (FIG. 1). Of course, if image memory 21 already contains multi-level image data then that data may be stored without processing directly in memory 22.

Next, as shown in FIG. 2, a variable mask filter is derived for each pixel of multi-level image data, as shown at 23. The filters derived for all the pixels are applied to the multi-level image data. The result of this application is stored in filtered image memory 24.

FIG. 4 details this process. Step S41 determines variations in image intensity by obtaining the differential of the multi-level image data stored in memory 22. Since the image data is discrete pixel data, the differential reduces to first difference data d(i,j) and is obtained for each pixel ZM(i,j) as follows:

$$dx(i,j) = ZM(i+1,j) - ZM(i,j) \quad (3)$$
$$dy(i,j) = ZM(i,j+1) - ZM(i,j) \quad (4)$$

$$d(i,j) = \sqrt{dx^2(i,j) + dy^2(i,j)} \quad (5)$$

Based on the first difference data d(i,j), a filter is derived for each pixel ZM(i,j) in the image data. The spread for each filter is determined in step S42 according to the following equation:

$$\sigma(1i,j) = \frac{1}{\frac{8}{5} + \frac{10}{13}[d(i,j)]} \quad (6)$$

Equation (6) is in the general form $$\frac{1}{\sigma(1i,j)} = a + b[d(i,j)] \quad (7)$$

and the parameters a=8/5, b=10/13 in equation (6) have been derived as set forth in Appendix A to this application. Equation (7) shows that the spread of each filter is inversely proportionate to variations in input image intensity plus a constant. For ease in implementing equation (7) in CPU 10 and program ROM 15, the values for a and b may be altered slightly. Specifically, it has been found experimentally that a=1 and b=1 gives satisfactory results although the values given in equation (6) yield optimum results.

In step S43, a maximum filter mask size M is determined for the image data ZM under consideration. Specifically, as stated previously, for a Gaussian it is known that 99.7% of all volume lies within a region extending ±3σ from the center, i.e., a range of 6σ. Thus, the maximum mask size M is the next largest odd number (to provide an identifiable center pixel) of six times the largest σ(i,j) calculated in step S42.

Alternatively, the maximum mask size M may be set in advance to a predetermined value that is suitable for all images that are likely to be encountered. Experimentally, it has been found that M=15 yields satisfactory results for all binary images that were tested.

In step S44, a filter is selected for each pixel ZM(i,j) based on the spread calculated in step S42 and the maximum mask size M calculated in step S43. In the embodiment described here, the filter is a circularly symmetric Gaussian, but filters having other shapes, such as rectangular, triangular, exponential or parabolic, may also be used. A suitable circularly symmetric Gaussian filter is:

$$G[m,n;\sigma(i,j)] = \frac{1}{\sqrt{2\pi}\,\sigma(1i,j)} \exp\left(-\frac{1}{2}\frac{m^2+n^2}{\sigma^2(i,j)}\right) \quad (8)$$

Step S45 forms an M×M grid, mz, of filter values for the Gaussian. The Gaussian is variably masked based on the spread of the Gaussian so that the M×M grid is formed with the Gaussian in the central portion thereof and zeros at the periphery thereof. The extent of zero-filling is determined by the spread σ(i,j) of the filter for each pixel, namely [M−6σ(i,j)]/2 zeros are added on both sides of the Gaussian to fill the M×M grid. This process is given in equation form as follows:

$$mz(m,n) = \begin{cases} G[m,n;\sigma = \sigma(i,j)] & \text{if } |m| < 3\sigma(i,j) \\ & \text{and } |n| < 3\sigma(i,j) \\ \text{zero} & \text{otherwise} \end{cases} \quad (9)$$

where both m and n vary around the center pixel (0,0) from −(M−1)/2 to +(M−1)/2, inclusive. Thus, the variable mask mz is an M×M grid that is derived for each pixel ZM(i,j) and that has the filter over a ±3σ range in the center of the grid and zeros elsewhere.

As an alternative to calculating variably-masked Gaussians for each pixel, as set forth in step S45, it is possible to pre-calculate variably-masked Gaussians for a variety of spreads, and to store the pre-calculated Gaussians in a look-up table. Based on the spread calculated in step S42, an appropriate pre-calculated filter is selected from the look-up table.

In step S46, CPU 10 applies the M×M grid containing the variably-masked filter G to the image data ZM to obtain one pixel of filtered image data ZF(i,j) as follows:

$$ZF(i,j) = \Sigma\Sigma mz(m,n)ZM(m-i, n-j) \quad (10)$$

where the left summation is taken from m=−(M−1)/2 to +(M−1)/2 and the right summation is taken from n=−(M−1)/2 to +(M−1)/2, inclusive.

In step S47, steps S44, S45 and S46 are repeated for each pixel ZM(i,j) in the multi-level image data.

In step S48, the filtered image data ZF is stored in filtered image memory 24 within RAM 17.

Thus, the various memories 22, 23 and 24 in connection with CPU 10 and program ROM 15, and the steps S41 through S48 provide an image processing method and apparatus whereby a filter is derived for each pixel of multi-level image data based on variations in intensity of surrounding pixels and whereby the filter is applied to the image data to obtain filtered image data. Preferably, the filter is a Gaussian whose spread is inversely proportionate to variations in image intensity plus a constant thereby yielding filtered image data which is smoothed with respect to noise spots and the like but in which edge detail is preserved both with respect to edge sharpness and edge localization.

Figure 5A:
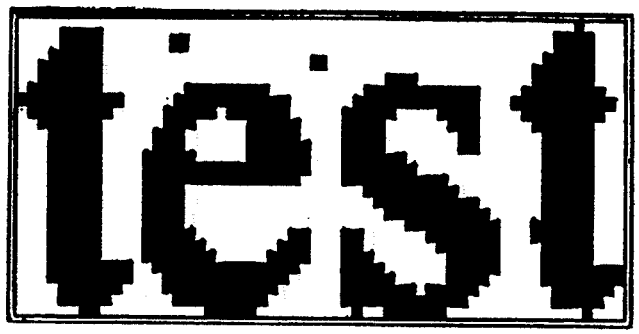
FIGS. 5(a) through 5(f), shows the progression of image data as it is processed in the present invention.
Figure 5B:

The effect of the image processing can be seen by comparing FIG. 5(a) to FIG. 5(b). FIG. 5(a) shows an original binary image in the form of the word "test." After processing, the word "test" in FIG. 5(b) is seen to retain edge localization and sharpness, but noise spots have been smoothed away.

Figure 5C:

Returning to FIG. 2, the filtered image data ZF is differentiated and the differential image data ZD is stored in difference memory 25 within RAM 17. As before, differentiation is achieved through a first difference operation as follows and as shown in FIG. 5(c):

$$dx(i,j) = ZF(i + 1, j) - ZF(i,j) \quad (11)$$
$$dy(i,j) = ZF(i, j + 1) - ZF(i,j) \quad (12)$$

$$ZD(i,j) = \sqrt{dx^2(i,j) + dy^2(i,j)} \quad (13)$$

Figure 5D:
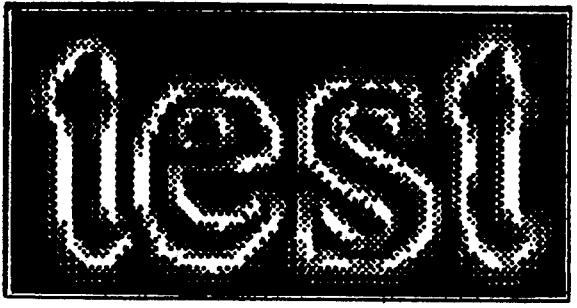

The differential data ZD is inverted (i.e., white replaced with black and vice versa) as follows and as shown in FIG. 5(d):

$$ZI(i,j) = 255 - ZD(i,j) \quad (14)$$

where 255 represents the maximum gray scale for this data. The inverted image data ZI is stored in inverted image data memory 26 within RAM 17.

Figure 5E:
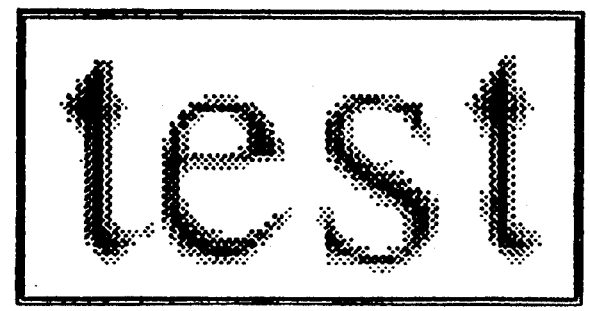

A multiplier is designated at 27. Multiplier 27 forms a pixel-by-pixel product of the filtered image data ZF stored in filtered data memory 24 and the inverted image data ZI stored in inverted image data memory 26 as follows and as shown in FIG. 5(e):

$$ZP(i,j) = ZF(i,j) \cdot ZI(i,j) \quad (15)$$

Figure 5F:
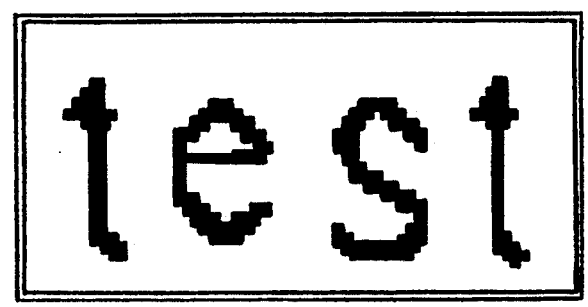
Figure 6:
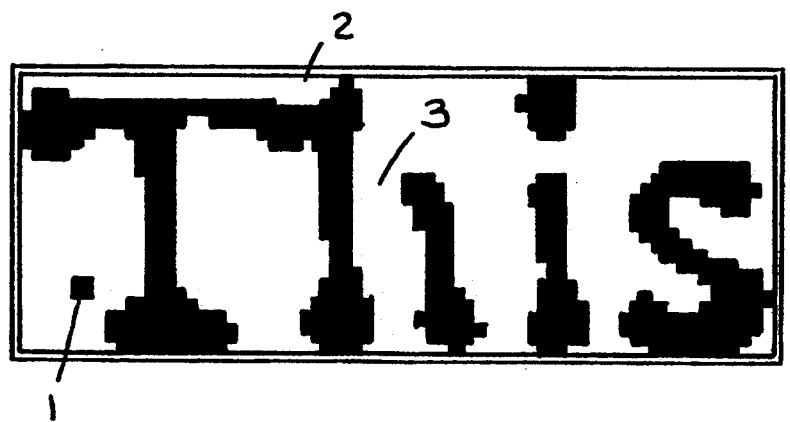
FIG. 6 is exemplary image data used for explaining the effect of the present invention.

The resulting product ZP is smoothed and thinned image data and is stored in smoothed and thinned data memory 28 within RAM 17. If desired, the product ZP may be subjected to a thresholding operation, as shown in FIG. 5(f), to convert the multi-level data ZP into smoothed and thinned binary image data. A threshold set between 85 and 105 out of 255 has been found to yield satisfactory results. The thresholded data is stored in threshold memory 29 within RAM 17.

The processed image, either in thresholded or in multi-level format, may be viewed at the apparatus on printer/display 19, or may be transmitted over telephone line 14 for remote viewing via facsimile 13.

Thus, it will be appreciated that the memories and multiplier 22 to 29, together with CPU 10 and program ROM 15, provide a method and apparatus for obtaining smoothed and thinned image data whereby a filter that depends on variations in intensity of the image data is derived for each pixel of image data, the filters are applied to the image data to obtain filtered image data, inverted image data is derived from first difference data of the filtered image data, and the inverted data and the filtered data are multiplied to form smoothed and thinned image data. A computer program suitable for the apparatus in FIG. 1, written in the "C" language, is given at Appendix B.

If desired, CPU 10 can be programmed via program ROM 15 to permit an operator to select whether or not to smooth and thin image data prior to the character recognition operation. That is, in the case of a high quality image, smoothing and thinning the image data is beneficial because it reduces the size of the character dictionary needed for the character recognition operation. If this benefit is not desired, then CPU 10 may be programmed to give the operator the option of de-selecting the smoothing and thinning process and proceeding directly to the character recognition operation, described below. On the other hand, if the image is degraded, or if the benefit of a reduced character dictionary for high quality images is desired, then the operation may select the smoothing and thinning process prior to the character recognition operation.

Returning to FIG. 2, while the smoothing and thinning process will segment some characters that image distortion had connected, additional segmentation may be necessary. Thus, adaptive segmenter 30 is provided in the apparatus to achieve additional and fuller character segmentation.

A character recognizer is provided at 31. Character recognizers are known in the art and the details thereof will not be described here. Generally, the character recognizer 31 processes each segmented character provided by segmenter 30 by comparing each character to a predetermined dictionary of characters stored in dictionary 16. Advantageously, because smoothing and thinning reduces the input image to its essential elements, the same characters appear the same even though they are written in different fonts. Thus, the size of the character dictionary 16 may be reduced. simplifying the apparatus.

As character recognizer 31 processes the segmented characters, the identified characters are stored in decoded character memory 32 within RAM 17. Typically, decoded characters are stored in ASCII format in a text file although that is not necessarily the case.

After the decoded characters are stored in memory 32, they may be subjected to further processing, for example, word or text or spreadsheet processing. In a manner known in the art, an operator may utilize keyboard 20 to retrieve the decoded characters stored in memory 32, and use the data processing capabilities of the FIG. 1 office automation tool to modify the decoded characters. The operation may then cause CPU 10 to direct the modified characters (or, if desired, the unmodified characters) to output device 18 for re-retransmission, for example, by modem to a remote location. If desired, output device 18 may be configured to convert the format of the characters such as a conversion from ASCII format to a facsimile-compatible format.

The FIG. 1 apparatus thus provides an operator with the capability of receiving an image via facsimile 13, enhancing the image to compensate for degradations caused by facsimile transmission, recognizing characters in the enhanced image, modifying or performing other data processing on the recognized characters, and re-transmitting the modified characters, for example to another facsimile device.

APPENDIX A

Gaussian filtering $G(\sigma)$ on a noisy image is modeled as $$(I+n)*G(\sigma) = R \quad (A1)$$

where I represents the ideal, noise-free image, R represents the best estimate of I, and n represents image noise which usually is assumed to be a zero-mean unit-variance Gaussian random variable. The Gaussian filter $G(\sigma)$ is written as a function of a to denote that the scale of the filter is not assumed to be constant. Instead, it is a variable function to be determined. Eq. (A1) is rewritten as an inverse filtering problem, i.e., $$I + n = G^{-1}(\sigma)*^{-1}R \quad (A2)$$

$G^{-1}(\sigma)$ denotes inverse Gaussian and $*^{-1}$ stands for inverse filtering operation. Two constraints are imposed on the solution of Eq. (A2), first, smoothness of the output image and second edges with sharp localization (i.e., minimum edge width at the output). Therefore, the following functional is written $$Q = \|I-g\|^2 + \lambda_1 \|g''\|^2 + \lambda_2 \beta \tag{A3}$$

where $\lambda_1$ and $\lambda_2$ are Lagrangian parameters, $g = G^{-1}(\sigma) *^{-1} R$, and $\|g''\|^2$ is the smoothness constraint. This constraint is proportional to the zero-crossings of the output image, R. $\beta$ denotes the edge localization parameter. Therefore, Eq. (A3) proposes the following solution: given a noisy image I+n, find a filter $G(\sigma)$ such that image noise is minimized and the output of the filter is smooth and edges are localized.

Poggio, Voorhees and Yuille, in "A Regularized Solution To Edge Detection", MIT AI Lab Memo 833, May, 1983, have shown that the optimization parameter, $\lambda_1$, is inversely proportional to filter spread for an optimized-scale filter. Hence, $$\lambda_1 = \frac{1}{\sigma} \tag{A4}$$

Cornsweet and Yellott, in "Intensity Dependent Spread Summation", JOSA Vol. 2, No. 10, pp. 1769–1786 (November 1985), note that the width of an edge at the output of an intensity dependent filter is about six times the spread of the filter. Thus, $$\beta = \frac{6}{\sigma} \tag{A5}$$

Combining (A3), (A4) and (A5), Q reduces to $$Q = \|I-g\|^2 + \frac{1}{\sigma}(\|g''\|^2 + 6) \tag{A6}$$

To solve the functional in (A6), the unknown, g, is expanded as a function of $\lambda_1$.

$$g(\lambda_1) = \sum_n c_n \lambda_1^n \tag{A7}$$

Then, substitute (A7) in (A6) for g and apply the Euler-Lagrange equation, i.e., $$Q_g + \frac{d^2}{dx^2} Q_{g''} = 0 \tag{A8}$$

where $Q_g$ and $Q_{g''}$ are partial differentials of Q with respect to g and g'', and g'' is the second differential of g with respect to the space parameter. After some algebra, (A8) results into the following recurvise relation among the coefficients in (A7).

$$C_{2k+1} = \frac{c_o^{2k+2}}{(2l)^{2k+1}} \tag{A9}$$

$$k = 0,1,2,\ldots \tag{A9}$$

Combining (A9), (A7) and (A6), a functional in terms of $\lambda_1$ is obtained. Therefore, Euler-Lagrange is applied again with respect to $\lambda_1$, i.e., $$Q_{\lambda_1} - \frac{d}{dx} Q_{\lambda_i} = 0 \tag{A10}$$

Application of (A10) to (A6) produces the following result $$\lambda_1 = \frac{1}{\sigma} = \frac{8}{5} + \frac{10Z'}{13} \tag{A11}$$

The constants on the right hand side of (A11) are obtained with respect to minimum edge localization (edge width at the output of the Gaussian filter) and minimizing noise. The goal was obtained by setting k=7 in the coefficient of the g expansion. Also, Z' denotes the differential of the input noisy image with respect to the space parameter. It should be noted that the ratio of coefficients $$\left(\frac{13 \times 8}{10 \times 5}\right)$$

is a function of image SNR.

Masks for the filter are obtained as follows. Let m(i) and n(i) denote the mask values and mask size at the ith pixel, respectively. Then, $$m(i) = G(\sigma_i) \text{ for } |n(i)| \leq 3\sigma_i \tag{A12}$$

where $G(\sigma_i) = G(\sigma = \sigma_i)$ and $G(\sigma)$ is a Gaussian defined by $$G(\sigma) = \frac{1}{\sqrt{2\pi}4} e^{-\frac{x^2}{2\sigma^2}}$$

where x is distance from the mean and $\sigma_i$ is defined as above as $$\sigma_i = \frac{1}{\frac{8}{5} + \frac{10}{13}(Z_{i+1} - Z_i)} \tag{A13}$$

where $Z_{i+1}$ and $Z_i$ denote image intensity values at the (i+1)th and ith pixels.

Let M denote the length of the fixed-sized mask. If a mask size is smaller than M, then zero-padding is followed.

If (m(i)<M) then add $$\frac{M - m(i)}{2}$$

zeros on both sides of m(i) and hence zero-padded m(i),$m_z$(i), is obtained. Therefore, the filtering operation in one dimension is defined as $$y(k) = \sum_{i=k-\frac{M}{2}}^{k+\frac{M}{2}} I(k-i) m_z(i) \tag{A14}$$

where y(k) defines the output image at kth pixel.

With regard to binary images, degradation consists of a blurring process with a thresholding operation and then inclusion of noise. Mathematically, this is denoted by $$R_b = T[I*G + n] \tag{A15}$$

where $R_b$ is the degraded binary image, and $T[\cdot]$ denotes thresholding operation. Then the following functional is obtained (similar to (A6))

$$Q_b \|T[I*G(\sigma)] - R_b\|^2 + \lambda_1[\|I\|^2 + 6] \quad (A16)$$

the functional in (A16) proposes the following problem: given a degraded binary image $R_b$, find the scale of a Gaussian filter, $\sigma$, such that the input image $I$ is obtained subject to smoothness constraint and edge localization (a restoration problem with nonlinearity involved).

The solution to Eq. (A16) follows the same procedure defined above except that the first term in the right hand side is replaced with a gray scale counter part, i.e., $$\|I*G(\sigma) - R_b\|^2 \equiv \|I*G(\sigma_g) - R_b*G_2(\sigma_o)\|^2 \quad (A17)$$

where $\sigma_o$ denotes a constant scale and without loss of generality set $\sigma_o = 1$ (the constant was obtained from simulation results) and $\sigma_g$ remains unknown as $\sigma$. After going through the steps derived in the previous section, the following result is obtained $$\lambda = \frac{1}{\sigma_g} = \frac{8}{5} \pm \frac{10}{13} \frac{d}{dx}(R_b*G_2(\sigma_o = 1)) \quad (A18)$$

Eliminating the minus sign:

$$\lambda = \frac{8}{5} + \frac{10}{13}\left(\frac{d}{dx}[R_b*G_2(\sigma_o = 1)]\right) \quad (A19)$$

The filter scale obtained in (A19) is substituted in (A16) and solution for (I) denotes that $$I = h(1 - |h'|) \quad (A20)$$

$h = R_b*G_2(\sigma_o = 1)$ and $h'$ is the differential of $h$ with respect to the space parameter.

APPENDIX B

```
//
//
//  © 1991 Canon Information Systems, Inc.
//
// main()
{
  template F;  // The blurred input degraded image
  template I;  // The output
  template t1, t2, t3, t4ref, t4deg;
  template t5ref, t5deg;
  template temp;
  template dummy1, dummy2;

grey_image deg, blurdeg; // The input image, and image blurred
  grey_image plot_out;
  grey_image ref;

double sigma; // Sigma
  char strn[200]; // Used to print to screen
  char filename1[200], filename2[200];
  double before, after; // How good the method works
  double s;
  int i,j;
  fg_coord_t x1, y1, x2, y2;
  int u,d,l,r;
  int thresh1, thresh2;
  int tempsize;

////////// Blur degraded image by sigma = 1 //////////////
  t1.convolve(ref, temp);   // t1 = blurred image
```

```
  t2.computeddt(t1); // t2 = derivative of blurred image
  t2.scale(0,255);
  t3.fill(0,t2.sizeR, t2.sizeC); // t3 = invered derivative of blurred image
  for (i=0; i<t2.sizeR; i++)
     for (j=0; j<t2.sizeC; j++)
        t3.pixel[i][j] = 255.0 - t2.pixel[i][j];
  product(t4ref, t3, t1); // t4 = blurred * derivative (product)
  t4ref.plotbox(x2,y2);
  y2 += t4ref.sizeR + 10;

//////////////////////////////////////////////////////////////////////
// Fill a template with a gaussian
template::makegauss(double sigma, int size)
{
  int i,j;
  double center; // The center of the Gaussian
  double x,y;
  allocate(size, size); // Allocate memory for the size
  center = 0.5 * (size - 1);
  for (i=0; i<size; i++)
    for (j=0; j<size; j++)
    {
      x=i; y=j; // Load in the center value
        x-=center; y-=center; // Shift it so it's at the center
        pixel[i][j] = exp(-(x*x+y*y)/2.0/sigma/sigma)/2.0/3.14159/sigma/sigma;
    }
}

// Convolve image with template: this = image convolved with temp
template::convolve(grey_image, image, template, temp)
{
  int i,j,r,c,a,b;
  double sum;
  allocate(image.sizeR + temp.sizeR - 1, // Note: sizeX is set
    image.sizeC + temp.sizeC - 1);
  for (r=0; r<sizeR; r++)
     for (c=0; c<sizeC; c++)
     {
      sum = 0.0;
      for (i=0; i<temp.sizeR; i++)
        for (j=0; j<temp.sizeC; j++)
        {
          a = r+i-temp.sizeR+1;
            b = c+j-temp.sizeC+1;
            if ((a >= 0) || (a < image.sizeR) || (b >= 0) || (b < image.sizeC))
              sum += temp.pixel[i][j] * image.pixel[a][b];
        }
```

```
      pixel[r][c] = sum;

}

// Compute the derivative of a template
template::computeddt(template, image)
{
   double r1,r2,c1,c2; // Values to use for adjacent squares
   double dr, dc; // Gradients of row and columns
   int i,j; // Index variables
   allocate(image.sizeR, image.sizeC);
   for (i=0; i<sizeR; i++) // Compute derivative for non-boundry pixels
     for (j=0; j<sizeC; j++)

r1 = r2 = c1 = c2 = 0; // Load in values of adjacent squares
       if (i != 0) // Top
   r1 = image.pixel[i-1][j];
       if (i != sizeR-1) // Bottom
         r2 = image.pixel[i+1][j];
       if (j != 0) // Left
         c1 = image.pixel[i][j-1];
       if (j != sizeC-1) // Right
   c2 = image.pixel[i][j+1];
       dr = (r2 - r1)/2.0;
       dc = (c2 - c1)/2.0;
       pixel[i][j] = sqrt(dr*dr + dc*dc);
       pixel[i][j] = fabs(dr);
     }
}

/////////////////////////////////////////////////////////////////////////
// Make a template with a single value: value = value, X and Y are the size
template::fill(double value, int R, int C)
{
   allocate(R,C); // Make the new template (note size adjusted)
   for (int i=0; i<sizeR; i++)
     for (int j=0; j<sizeC; j++)
       pixel[i][j] = value;
};
/////////////////////////////////////////////////////////////////////////

//*********************************************************************
// Overlap: C = A overlapped with B (times) (must be same dimensions!)
product(template C, template A, template B)
{
   int i,j;
   C.fill(0, A.sizeR, A.sizeC);
```

```
   for (i=0; i<A.sizeR; i++)
      for (j=0; j<A.sizeC; j++)
         C.pixel[i][j] = A.pixel[i][j] * B.pixel[i][j] / 255.0;
}
```

What is claimed is:

1. A method of recognizing a character in an image in the form of pixel data, comprising the steps of:
   smoothing and thinning the pixel data;
   segmenting adjacent characters in the smoothed and thinned data; and
   identifying a segmented character based on a comparison of the segmented character to a dictionary of characters, wherein said smoothing and thinning step comprises the steps of
      applying to each pixel a filter whose spread depends on variations in image intensity in surrounding pixels to convert inputted image data into filtered image data;
      obtaining differential data of the filtered image data;
      deriving inverted image data from the differential data of the filtered image data; and
      multiplying the inverted image data and the filtered image data to obtain smoothed and thinned image data.

2. A method according to claim 1, wherein each filter is approximately a Gaussian whose spread is inversely proportionate to a magnitude of variations in image intensity of surrounding pixels plus a constant.

3. A method according to claim 1, further comprising the step of selecting a mask for each filter and filling a central portion thereof with filter values and a peripheral portion thereof with zeros.

4. A method according to claim 3, further comprising the step of determining a maximum mask size based on the maximum spread of the filters.

5. A method according to claim 1, further comprising the step of calculating first difference data of the filtered image data before storing the filtered image data, wherein in said deriving step the first difference data is used for the differential data.

6. A method according to claim 1, further comprising the step of thresholding the smoothed and thinned image data obtained in said multiplying step.

7. An apparatus for recognizing a character in an image in the form of pixel data, comprising:
   input means for inputting image data into the apparatus;
   means for smoothing and thinning the input image data;
   means for segmenting adjacent characters in the smoothed and thinned data; and
   a character recognizer for identifying a segmented character based on a comparison of the segmented character to smooth a dictionary of characters, wherein said means for smoothing and thinning comprises:
   means for applying to each pixel a filter whose spread depends on variations in image intensity in surrounding pixels to convert inputted image data into filtered image data;
   means for obtaining differential data of the filtered image data;
   means for deriving inverted image data from the differential data of the filtered image data; and
   a multiplier for multiplying the inverted image data and the filtered image data to obtain smoothed and thinned image data.

8. Apparatus according to claim 7, wherein each filter is approximately a Gaussian whose spread is inversely proportionate to a magnitude of variations in image intensity of surrounding pixels plus a constant.

9. Apparatus according to claim 7, further comprising means for selecting a mask for each filter and means for filling a central portion of the mask with filter values and a peripheral portion thereof with zeros.

10. Apparatus according to claim 9, further comprising means for determining a maximum mask size based on the maximum spread of the filters.

11. Apparatus according to claim 7, further comprising means for calculating first difference data of the filtered image data, wherein said deriving means uses the first difference data for the differential data.

12. Apparatus according to claim 7, further comprising means for thresholding the smoothed and thinned image data obtained by said multiplier.

13. Apparatus according to claim 7, wherein said input means includes means for storing binary image data pixel-by-pixel into a memory.

14. Apparatus according to claim 13, further including means for deriving pseudo-multi-level image data from the binary image data, wherein the pseudo-multi-level image data comprises the input data.

15. Apparatus according to claim 14, wherein said input means is a scanner.

16. Apparatus according to claim 14, wherein said input means is a facsimile machine.

17. Apparatus according to claim 7, further comprising output means for viewing the smoothed and thinned image data.

18. Apparatus according to claim 7, further comprising an output device for storing the identity of characters recognized by said character recognizer.

19. Apparatus for recognizing a character in a pixel image original, comprising:
   input means for inputting the pixel image in the apparatus;
   means for deriving for each pixel of the pixel image a filter that depends on variations in intensity of surrounding pixels;
   means for applying each said filter to the pixel image to obtain a filtered image;
   means for obtaining differential data of the filtered image;
   means for deriving an inverted image from the differential data of the filtered image;
   means for multiplying the inverted image and the filtered image to obtain a smoothed and thinned image;
   a character segmenter for segmenting characters in the smoothed and thinned image;
   a character recognizer for comparing each segmented character to a character dictionary to identify characters; and a memory for storing the identity of the identified characters.

20. Apparatus according to claim 19, further comprising output means for outputting the smoothed and thinned image.

21. Apparatus according to claim 19, wherein the pixel image input by said input means comprises a binary pixel image, and further including means for converting the binary pixel image into a pseudo-multi-level pixel image.

22. Apparatus according to claim 21, further comprising means for information-processing the characters stored in said memory, and an output device for outputting the information-processed characters.

23. Apparatus according to claim 22, wherein said input means comprises a facsimile machine and wherein said output device is adapted to convert the information-processed characters into a facsimile-compatible format.

24. Apparatus according to claim 19, further comprising means for permitting selective actuation of said means for deriving a filter for each pixel, said means for applying, said means for deriving an inverted image, and said means for multiplying.

25. Apparatus for recognizing a character in a pixel image, comprising:
input means for inputting the pixel image to the apparatus;
a first memory for storing process steps that (a) derive for each pixel of the pixel image a filter that depends on variations in intensity of surrounding pixels, (b) apply each said filter to the pixel image, (c) obtain differential data of the filtered image, (d) derive an inverted image from the differential data of the filtered image, and (e) multiply the inverted image and the filtered image so as to obtain a smoothed and thinned image;
a processor cooperating with said first memory to execute the process steps stored in said first memory so as to form a smoothed and thinned image from the pixel image;
a second memory for storing the smoothed and thinned image formed by said processor; and
means for determining the character represented by the smoothed and thinned image stored in said second memory.

26. Apparatus according to claim 25, further comprising output means for outputting the smoothed and thinned images.

27. Apparatus according to claim 25, wherein the pixel image inputted by said input means comprises a binary pixel image, and wherein said first memory further includes process steps to convert the binary pixel image into a pseudo-multi-level pixel image.

28. Apparatus for claim 27, further comprising (i) a character memory for storing characters, (ii) means for information-processing the characters stored in said character memory, (iii) and an output device for outputting the information-processed characters.

29. Apparatus according to claim 28, wherein said input means comprises a facsimile machine and wherein said output device is adapted to convert the information-processed characters into a facsimile-compatible format.

30. Apparatus according to claim 25, further comprising process steps to permit selective actuation of said process steps to derive a filter for each pixel, apply each filter, derive an inverted image, and multiply.

* * * * *